United States Patent [19]

Miyoshi et al.

[11] 4,326,187
[45] Apr. 20, 1982

[54] VOLTAGE NON-LINEAR RESISTOR

[75] Inventors: Tadahiko Miyoshi; Takeo Yamazaki; Kunihiro Maeda; Ken Takahashi, all of Hitachi, Japan

[73] Assignee: Hitachi, Ltd., Tokyo, Japan

[21] Appl. No.: 195,257

[22] Filed: Oct. 8, 1980

[30] Foreign Application Priority Data

Oct. 8, 1979 [JP] Japan .................................. 54-128916
Jan. 18, 1980 [JP] Japan .................................. 55-3562

[51] Int. Cl.$^3$ ............................................. H01C 7/10
[52] U.S. Cl. ..................................... 338/21; 252/518; 361/127
[58] Field of Search ................... 338/20, 21; 361/127, 361/39; 252/518, 520, 521; 29/610, 621

[56] References Cited

U.S. PATENT DOCUMENTS 3,872,582  3/1975  Mutsuoka et al. ................. 252/521
3,905,006  9/1975  Matsuoka et al. ...................... 338/21
4,031,498  6/1977  Hayashi et al. ....................... 338/21

FOREIGN PATENT DOCUMENTS 53-18099   6/1978  Japan ..................................... 338/21
54-137695 10/1979  Japan ..................................... 338/21
55-19041   5/1980  Japan ..................................... 338/21

Primary Examiner—C. L. Albritton
Attorney, Agent, or Firm—Craig and Antonelli

[57] ABSTRACT

Disclosed is a voltage non-linear resistor comprising a sintered body composed mainly of zinc oxide, said sintered body including confronting main faces and a face side face connecting the main faces to each other, which has the side face coated with a coating glass layer containing barium oxide. The coating glass layer comprises 40 to 85% by weight of lead oxide, 3 to 25% by weight of boron oxide. 1.5 to 25% by weight of silicon oxide and 0.2 to 15% by weight of barium oxide. The barium oxide acts as a catalyst and exerts a function of completely burning an organic binder at a temperature lower than about 400° C. where the reaction between the organic binder and zinc oxide is not substantially advanced.

22 Claims, 3 Drawing Figures

VOLTAGE NON-LINEAR RESISTOR

BACKGROUND OF THE INVENTION

(1) Field of the Invention

The present invention relates to a voltage non-linear resistor having a large non-linear coefficient, which is composed of a sintered body comprising zinc oxide as the main ingredient.

(2) Description of the Prior Art

A voltage non-linear resistor composed of a sintered body obtained by adding an oxide such as bismuth oxide, manganese oxide, cobalt oxide, antimony oxide, nickel oxide, chromium oxide, silicon oxide, boron oxide, lead oxide, magnesium oxide or aluminum oxide to zinc oxide as the main ingredient and shaping and sintering the mixture, or of a sintered body obtained by adding an oxide such as lanthanum oxide, praseodymium oxide, samarium oxide, neodymium oxide, cobalt oxide or manganese oxide to zinc oxide as the main ingredient and shaping and sintering the mixture has been used widely as a voltage stabilizing element, a surge absorber or an arrester. When a voltage non-linear resistor of this type is used as a high voltage surge absorber or arrester, the side face is protected with glass so as to prevent the face flashover. Such device is disclosed in the specification of U.S. Pat. No. 3,905,006 to Matsuoka et al.

The known voltage non-linear resistor comprises a sintered body comprising zinc oxide as the main ingredient, electrodes formed on confronting main faces, respectively, and a glass layer formed on the side face connecting the main faces to each other. Since a high-resistance glass layer is formed on the side face, in this element, the face flashover hardly takes place. This element is also advantageous in that since the side face of the element is smooth, it is hardly contaminated.

A voltage non-linear resistor including a high-resistance intermediate layer comprising zinc antimonate and zinc silicate as the main ingredient, which is formed below the above-mentioned glass layer, has an especially high resistance to the face flashover.

In the conventional voltage non-linear resistors, a lead borosilicate glass having a thermal expansion coefficient of $50 \times 10^{-7}$ to $100 \times 10^{-7}/°C$. or a zinc borosilicate glass having a similar thermal expansion coefficient, or a glass formed by incorporating titanium oxide, aluminum oxide or copper oxide in such glass has been used as a coating glass layer because of the following characteristic properties:

(1) High heat cycle resistance.
(2) Good moisture resistance.
(3) Easiness in handling.

For coating the side face of a resistor with such glass, such glass powder is mixed with an organic binder to form a glass plate, the paste is applied to the side face of the resistor and is then heated and baked in an oxidative atmosphere at 400° to 650° C.

However, a resistor having the side face coated according to the above-mentioned method is defective in that the leak current in the low voltage region is larger than in a resistor free of a glass coating and the linearity is inferior. For example, the non-linear coefficient $\alpha$ is 50 in a resistor before the glass coating, but it is reduced to 20 or less after the glass coating.

SUMMARY OF THE INVENTION

It is therefore a primary object of the present invention to provide a voltage non-linear resistor in which the leak current in the low voltage region is small and the non-linear characteristic is good.

Another object of the present invention is to provide a voltage non-linear resistor which is excellent in the impulse resistance, the heat cycle resistance and the moisture resistance.

In accordance with the fundamental aspect of the present invention, there is provided a voltage non-linear resistor comprising a sintered body comprising zinc oxide as the main ingredient, the side face of the resistor being coated with a glass layer containing barium oxide.

In the conventional glass-coated zinc oxide type voltage non-linear resistor, the resistance value in the vicinity of the interface between the sintered body and the glass layer is relatively low, and it has been found that the voltage non-linear characteristic is reduced by the influence of the leak current generated in this portion. It is known that if the zinc oxide type resistor is heat-treated in nitrogen gas at a temperature higher than about 400° C., the resistance is reduced and the leak current is increased. It is construed that this reduction of the voltage non-linear characteristic is due to the organic binder present in the glass paste.

More specifically, it is construed that at a temperature of 400° to 500° C., the organic binder is burnt while taking out oxygen adsorbed on the surfaces of zinc oxide particles in the sintered body and the oxygen ion concentration on the surfaces of zinc oxide particles is reduced, with the result that the potential barrier is reduced in the grain boundary or boundary layer of the sintered body is reduced and the leak current is increased.

The present invention has been completed based on the above knowledge. Namely, according to the present invention, a catalyst is included into the glass paste, and the organic binder is completely removed by combustion at a low temperature below about 400° C. where the reaction of zinc oxide with the organic binder is hardly caused to advance.

Barium oxide is most preferred as the catalyst to be incorporated in the glass paste for the following reasons:

(1) The insulating strength of glass is not degraded.
(2) The dispersibility in glass is very good and combustion of the binder is uniformly accomplished.
(3) Barium oxide exerts a sufficient catalytic action at a temperature lower than 400° C.

As the voltage non-linear resistor to which the present invention can be applied, there can be mentioned, for example, (a) a sintered body comprising zinc oxide as the main ingredient, 0.01 to 10 mol % of bismuth oxide and 0.01 to 10 mol % of at least one ingredient selected from manganese oxide and cobalt oxide, (b) a sintered body formed by adding to the sintered body (a) 0.01 to 10 mol % of at least one ingredient selected from antimony oxide, nickel oxide, chromium oxide, silicon oxide, boron oxide, lead oxide, aluminum oxide, magnesium oxide and silver oxide, and (c) a sintered body comprising zinc oxide as the main ingredient, 0.01 to 10 mol % of lanthanum oxide, praseodymium oxide, samarium oxide, neodymium oxide, dysrosium oxide and thulium oxide, and 0.01 to 10 mol % of at least one ingredient selected from cobalt oxide and manganese oxide.

The glass layer formed to coat the side face of the sintered body for preventing the face flashover, which constitutes the characteristic feature of the present invention, contains barium oxide. This glass layer may also be formed on the main surface on which an electrode is formed, according to need.

As the glass forming the glass layer, there is preferably used a lead borosilicate glass, especially a lead borosilicate glass comprising 40 to 85% by weight of lead oxide, 3 to 25% by weight of boron oxide and 0.2 to 25% by weight of silicon oxide. When the silicon oxide content in the glass is 0.2 to 1.4% by weight, the moisture resistance is relatively reduced, but the non-linear coefficient α is improved and the glass baking temperature can be lowered. When the silicon oxide content is 1.2 to 25% by weight, the non-linear coefficient α is relatively lowered, but the moisture resistance is elevated. In view of the characteristic properties, it is preferred that the glass should comprise 50 to 80% by weight of lead oxide, 5 to 15% by weight of boron oxide and 2 to 15% by weight of silicon oxide. If the amount of lead oxide or boron oxide is too large or the amount of silicon oxide is too small, the moisture resistance or the insulating strength is reduced, and simultaneously, the thermal expansion coefficient is increased and the glass layer is readily cracked by the heat cycle. On the other hand, if the amount of lead oxide or boron oxide is too small or the amount of silicon oxide is too large, the thermal expansion coefficient is reduced to too low a level and the glass layer is readily cracked by heat cycle. Furthermore, in this case, a high temperature exceeding 700° C. is necessary for baking of the glass and the operation becomes disadvantageous.

The content of barium oxide in the glass is varied according to the amount of the binder in the present invention, but it is ordinarily preferred that the barium oxide content be 0.2 to 15% by weight. If the amount of barium oxide is too small, the catalytic action is insufficient, and if the barium oxide content is too high, strain is produced in the interface between the sintered body and the glass layer owing to the difference of the thermal expansion coefficient of barium oxide (about $180 \times 10^{-7}/°C.$) and the zinc oxide sintered body (about $70 \times 10^{-7}/°C.$), and therefore, the glass layer is cracked at the heat cycle or micro-cracks are formed, resulting in reduction of the insulating strength.

In order to increase the resistance to the heat cycle at temperatures ranging from the lowest application temperature (about $-30°$ C.) of the resistor to the glass-baking temperature, it is preferred that 4 to 30% by weight of zinc oxide be added to the glass to effect crystallization in the glass. Furthermore, 0.2 to 15% by weight of zirconium oxide or a small amount of a metal fluoride may be added.

The barium oxide-containing lead borosilicate glass is mixed with an organic binder to form a paste, and the paste is coated on the surface of the sintered body and is then baked.

The organic binder exerts a function of bonding glass powder to the sintered body and it is removed by combustion at a temperature lower than the glass-baking temperature. A polymeric substance is preferably used as the organic binder. For example, there can be used ethyl cellulose, polyvinyl alcohol and polyethylene glycol.

It is preferred that a high-resistance intermediate layer be formed between the sintered body and the glass layer. An intermediate layer comprising zinc silicate and zinc antimonate is preferred. If such intermediate layer is formed, mutual diffusion is caused between glass and zinc silicate at the glass-baking step and strong adhesion is attained between the sintered body and glass.

The intermediate layer is formed by coating an intermediate layer-forming paste of a binder and oxide powder on a shaped body as a precursor of the sintered body before sintering and then performing sintering at a temperature of about 1000° to 1300° C. Also at this sintering step, oxygen is removed from zinc oxide on the surface of the shaped body and is consumed for combustion of the binder.

Also in this case, the non-linear characteristic of the resistor is not reduced by this consumption of oxygen, because the grain boundary layer having influences on the voltage non-linear characteristic has not been formed yet and because even if oxygen is once consumed, oxygen is supplied from the outside afterwards by violent migration of substances during the sintering step.

DETAILED DESCRIPTION OF THE PREFERRED EMBODIMENTS

The present invention will now be described in detail with reference to the following Examples that by no means limit the scope of the present invention.

Incidentally, in these Examples, all of "%" are by weight.

EXAMPLE 1

Figure 1:
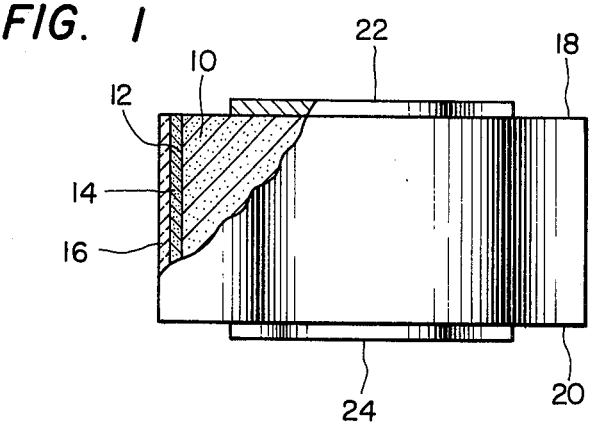
FIGS. 1, 2 and 3 are sectional views showing typical instances of the non-linear resistor to which the present invention is applied.
Figure 2:
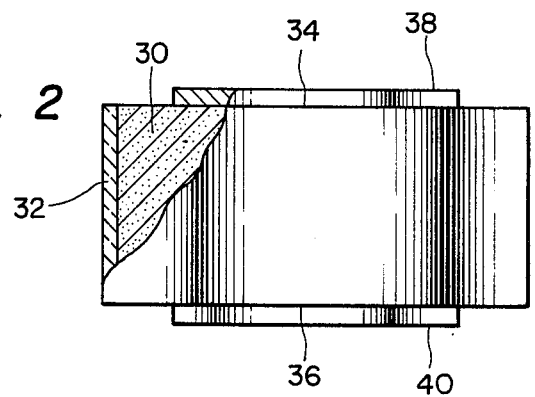

785.5 g of ZnO was mixed with 23.3 g of $Bi_2O_3$, 8.3 g of $Co_2O_3$, 5.8 g of $MnCO_3$, 29.2 g of $Sb_2O_3$, 7.6 g of $Cr_2O_3$, 7.5 g of NiO, 3.0 g of $SiO_2$, 0.8 g of $B_2O_3$ and 0.2 g of $Al(NO_3)_3$ for 10 hours by means of a ball mill. The starting powder was mixed with a 2% aqueous solution of polyvinyl alcohol in an amount of 10% based on the starting powder, and the mixture was granulated and shaped under a molding pressure of 750 $Kg/cm^2$ to form a shaped body having a diameter of 12 mm and a thickness of 5 mm. The shaped body was heat-treated by elevating the temperature at a rate of 100° C./hour and maintaining the shaped body at 900° C. for 2 hours. An oxide paste formed by kneading 112 g of $Bi_2O_3$, 175 g of $Sb_2O_3$ and 130 g of $SiO_2$ with 85 g of ethyl cellulose, 600 g of butyl carbitol and 150 g of butyl acetate was coated in a thickness of 100 to 200 μm on the side face of the heat-treated shaped body. Sintering was carried out by elevating the temperature at a rate of 100° C./hour and maintaining the shaped body at 1200° C. for 5 hours. During this sintering process, $Bi_2O_5$ in the paste was evaporated, and $Sb_2O_3$ and $SiO_2$ were reacted with ZnO, whereby a high-resistance intermediate layer 14 composed of $Zn_7Sb_2O_{12}$ and $Zn_2SiO_4$ as the main ingredients was formed on the side face 12 of the resulting sintered body 10 as shown in FIG. 1.

The so obtained sintered body 10 had such an excellent non-linear characteristic that the non-linear coefficient α at 10 μA to 1 mA was about 80. However, sharp convexities and concavities were formed on the surface of the sintered body and the sintered body was readily broken while it was handled. Furthermore, because contamination was not completely removed if the sintered body was once contaminated, the face flashover was readily caused at the inpulse test.

Then, a glass paste was prepared by kneading 400 g of a glass powder comprising 70% of PbO, 8% of $B_2O_3$, 3% of $SiO_2$, 16% of ZnO, 2% of BaO and 1% of $ZrO_2$ with 11 g of ethyl cellulose, 78 g of butyl carbitol and 30 g of butyl acetate, and this glass paste was coated in a thickness of 100 to 200 μm on the high-resistance intermediate layer 14 formed on the side face 12 of the sintered body 10. The coated sintered body was heat-treated in air by elevating the temperature at a rate of 200° C./hour and maintaining the sintered body at 470° C. for 10 minutes to form a glass layer 16. The main faces 18 and 20 of the sintered body were flatly polished, and aluminum electrodes 22 and 24 were formed thereon by spraying to obtain a resistor shown in FIG. 1.

The non-linear coefficient α of the so obtained resistor was high and 85 at a current of 10 μA to 1 mA. The side face of the resistor was smooth and was hardly contaminated, and furthermore, the moisture resistance was excellent. Accordingly, the value of the impulse resistance of this resistor was more than 2 times as large as that of the resistor having no glass coating formed thereon. The glass layer was closely bonded to the sintered body, and even if the heat cycle was repeated 1000 times in the temperature range of from −30° C. to 80° C., the glass layer was not peeled or cracked, and the properties of the resistor were not changed at all.

COMPARATIVE EXAMPLE 1

Resistors having a glass coating formed on the side face through a high-resistance intermediate layer were prepared in the same manner as described in Example 1 except that the following glass composition A or B free of barium oxide was used for formation of the glass layer.

Glass Composition A:
  72% of PbO, 8% of $B_2O_3$, 3% of $SiO_2$, 16% of ZnO and 1% of $ZrO_2$ Glass Composition B:
  70% of PbO, 8% of $B_2O_3$, 3% of $SiO_2$, 16% of ZnO, 1% of $ZrO_2$ and 2% of $Al_2O_3$ In each resistor, the leak current at a low voltage was increased by the glass coating, and the non-linear coefficient α was 29 in the resistor comprising the layer of the glass composition A and was 31 in the resistor comprising the layer of the glass composition B.

EXAMPLE 2

To 785.3 g of ZnO were added 46.6 g of $Bi_2O_3$, 16.6 g of $Co_2O_3$, 5.8 g of $MnCO_3$, 29.2 g of $Sb_2O_3$, 7.6 g of $Cr_2O_3$, 9.0 g of $SiO_2$, 3.2 g of $B_2O_3$, 7.5 g of NiO and 0.1 g of $Al(NO_3)_3$, and in the same manner as described in Example 1, a sintered body having a diameter of 30 mm and a thickness of 30 mm through the steps of kneading, granulation, shaping, heat treatment, oxide paste coating and sintering.

A glass paste having a composition shown in Table 1, 2 or 3 was prepared in the same manner as described in Example 1, and then coated and baked at 400° to 650° C. Then, electrode were formed on the main surfaces.

The properties of the so prepared resistors were measured to obtain results shown in Tables 1 to 3.

In these Tables, the heat cycle resistance was evaluated according to the following standard.

X: glass layer was cracked during gradual cooling to room temperature after sintering Δ: impulse resistance was reduced while heat cycle of −30° C.⇌80° C. was repeated 100 times ○: characteristic properties were not changed by the above heat cycle test ◉: glass layer was not cracked even if glass layer was taken out from the furnace just after sintering The moisture resistance was evaluated according to the following standard.

X: dissolution of glass or reduction of impulse resistance was caused when the resistor was dipped in water and allowed to stand Δ: dissolution of glass or reduction of impulse resistance was caused when the resistor was dipped in boiling water and allowed to stand ○: no reduction of impulse resistance was caused at the above test in boiling water The resistor having the moisture resistor ranked as ○ could be used under high temperature and high humidity conditions, and the resistor having the moisture resistance ranked as Δ could be used in the state where it was assembled in an arrester or insulator.

TABLE 1

| Run No. | Glass Composition (% by weight) | | | | | | | Non-Linear Coefficient α | Heat Cycle Resistance | Moisture Resistance |
|---|---|---|---|---|---|---|---|---|---|---|
| | PbO | $B_2O_3$ | $SiO_2$ | BaO | ZnO | $ZrO_2$ | $Al_2O_3$ | | | |
| 1 | 70 | 10 | 15 | 0.05 | — | — | 4.95 | 30 | ○ | ○ |
| 2 | 70 | 10 | 15 | 0.2 | — | — | 4.8 | 63 | ○ | ○ |
| 3 | 65 | 10 | 15 | 7.5 | — | — | 2.5 | 78 | ○ | ○ |
| 4 | 60 | 10 | 15 | 15 | — | — | — | 80 | ○ | ○ |
| 5 | 60 | 10 | 10 | 20 | — | — | — | 80 | X | — |
| 6 | 35 | 25 | 25 | 10 | — | — | 5 | 78 | X | — |
| 7 | 40 | 20 | 25 | 10 | — | — | 5 | 78 | ○ | Δ |
| 8 | 85 | 7 | 7 | 1 | — | — | — | 73 | | Δ |
| 9 | 90 | 3 | 5 | 2 | — | — | — | 79 | Δ | X |
| 10 | 60 | 9 | 30 | 1 | — | — | — | 73 | X | — |

TABLE 2

| Run No. | Glass Composition (% by weight) | | | | | | | Non-Linear Coefficient α | Heat Cycle Resistance | Moisture Resistance |
|---|---|---|---|---|---|---|---|---|---|---|
| | PbO | $B_2O_3$ | $SiO_2$ | BaO | ZnO | $ZrO_2$ | $Al_2O_3$ | | | |
| 11 | 56 | 17 | 25 | 2 | — | — | — | 79 | ○ | Δ |
| 12 | 65 | 10 | 1.5 | 10 | — | — | 13.5 | 76 | ○ | Δ |
| 13 | 65 | 10 | 0.5 | 10 | — | — | 14.5 | 76 | ○ | X |
| 14 | 60 | 30 | 5 | 5 | — | — | — | 75 | Δ | X |
| 15 | 60 | 25 | 10 | 5 | — | — | — | 77 | ○ | Δ |
| 16 | 70 | 3 | 17 | 10 | — | — | — | 74 | ○ | Δ |
| 17 | 70 | 1 | 19 | 10 | — | — | — | 75 | X | — |
| 18 | 80 | 5 | 10 | 5 | — | — | — | 80 | ○ | ○ |

TABLE 2-continued

| Run No. | Glass Composition (% by weight) | | | | | | | Non-Linear Coefficient α | Heat Cycle Resistance | Moisture Resistance |
|---|---|---|---|---|---|---|---|---|---|---|
| | PbO | B$_2$O$_3$ | SiO$_2$ | BaO | ZnO | ZrO$_2$ | Al$_2$O$_3$ | | | |
| 19 | 64 | 10 | 15 | 10 | 1 | — | — | 80 | ○ | ○ |
| 20 | 64 | 8 | 14 | 10 | 4 | — | — | 80 | ○ | ◎ |

TABLE 3

| Run No. | Glass Composition (% by weight) | | | | | | | Non-Linear Coefficient α | Heat Cycle Resistance | Moisture Resistance |
|---|---|---|---|---|---|---|---|---|---|---|
| | PbO | B$_2$O$_3$ | SiO$_2$ | BaO | ZnO | ZrO$_2$ | Al$_2$O$_3$ | | | |
| 21 | 60 | 10 | 10 | 10 | 10 | — | — | 78 | ◎ | ○ |
| 22 | 60 | 5 | 3 | 5.5 | 25 | — | 1.5 | 76 | ◎ | ○ |
| 23 | 55 | 5 | 3 | 7 | 30 | — | — | 79 | ◎ | ○ |
| 24 | 35 | 5 | 8 | 2 | 50 | — | — | 75 | X | — |
| 25 | 60 | 15 | 14.95 | 10 | — | 0.05 | — | 75 | ○ | ○ |
| 26 | 60 | 15 | 14.8 | 10 | — | 0.2 | — | 78 | ◎ | ◎ |
| 27 | 60 | 7 | 14 | 10 | — | 7 | 2 | 79 | ◎ | ◎ |
| 28 | 50 | 10 | 15 | 10 | — | 15 | — | 76 | ◎ | ◎ |
| 29 | 50 | 5 | 10 | 10 | — | 25 | — | 77 | X | — |
| 30 | 71 | 7 | 2 | 3 | 15 | 1 | 1 | 82 | ◎ | ○ |
| 31 | 60 | 5 | 9 | — | 25 | — | 1 | 29 | ◎ | ○ |
| 32 | 60 | 10 | 15 | — | — | 10 | 5 | 30 | ◎ | ○ |

As is apparent from the results shown in the above Tables, if BaO is not contained as in Run No. 31 or 32 or the content of BaO is too low, the non-linear coefficient α is very small.

When the amount of any of BaO, SiO$_2$, ZnO or ZrO$_2$ is too large, the heat cycle resistance is reduced as in Runs Nos. 5, 10, 24 and 29, and such product is not suitable when a high heat cycle resistance is required. If the PbO or B$_2$O$_3$ content is too low, the heat cycle resistance is relatively reduced as in Runs Nos. 6 and 17.

It will also be understood that if the ZnO content is 4 to 30% or the ZrO content is 0.2 to 15%, the heat cycle resistance is especially excellent.

EXAMPLE 3

To 785.3 g of ZnO were added 15 g of Bi$_2$O$_3$, 4 g of Co$_2$O$_3$, 2.9 g of MnCO$_3$ and 15 g of Sb$_2$O$_3$, and in the same manner as described in Example 1, a sintered body 30 having a diameter of 56 mm and a thickness of 20 mm was obtained through the steps of mixing, shaping, oxide paste coating and sintering. The sintered body was dipped in a liquid formed by dispersing 600 g of glass powder of Run No. 30 of Table 3 in 800 ml of a solution of 16 g of ethyl cellulose in trichlene, and the dipped sintered body was dried and baked at 400° C. for 10 minutes to form a glass layer 32. Both the main surfaces 34 and 36 were polished and electrodes 38 and 40 were attached thereto. The non-linear coefficient α of the so prepared resistor was 40, and even if 130 kA of impulse of 4 × 10 μs was applied to the resistor, the face flashover was not caused.

In contrast, in case of the resistor which was not subjected to the glass layer-forming and baking treatment, if 100 kA of impulse was applied, the face flashover was caused in 7 samples among 10 samples because of the surface contamination caused at the polishing step or electrode-attaching step.

When glass coatings were similarly prepared by using glass compositions of Runs Nos. 31 and 32 of Table 3, the non-linear coefficients α were 17 and 18, respectively.

EXAMPLE 4

In the same manner as described in Example 3, a mixture of 884 g of ZnO, 50 g of Bi$_2$O$_3$ and 66 g of MnCO$_3$ was kneaded, granulated and shaped, and the shaped body was sintered and coated with glass in the same manner as in Example 3 to obtain a resistor having a structure shown in FIG. 1. When the glass composition of Run No. 30 of Table 3 was used, the non-linear coefficient α was 40 and the impulse resistance value was 100 kA, and if the impulse current exceeded this level, flashover was caused in the interface between the sintered body 10 and the glass layer 16. When the glass composition of Run No. 31 of Table 3 was used, the non-linear coefficient was 9. In these resistors, since the glass layer was directly bonded to the sintered body, the value α was greatly influenced by the glass composition used for formation of the glass layer.

EXAMPLE 5

A mixture of 485 g of ZnO, 10 g of Nd$_2$O$_3$ or Sm$_2$O$_3$ and 5 g of Co$_2$O$_3$ was kneaded, granulated, shaped and sintered in the same manner as described in Example 4, and a paste containing the glass of Run No. 30 of Table 3 was coated in the sintered body and baked in the same manner as in Example 1. The non-linear coefficient α of the resistor was 25 when Nd$_2$O$_3$ was used or 23 when Sm$_2$O$_3$ was used. The impulse resistance was at least 2 times the impulse resistance of the resistor which was not coated with the glass. When the glass of Run No. 31 of Table 3 was used, the non-linear coefficient α was 7 (Nd$_2$O$_3$) or 6 (Sm$_2$O$_3$).

EXAMPLE 6

A sintered body was prepared through the steps of mixing, kneading, shaping, oxide paste coating and sintering in the same manner as described in Example 1, and a glass paste comprising glass paste (69.8% of PbO, 8.59% of B$_2$O$_3$, 2.62% of SiO$_2$, 1.70% of BaO, 20.0% of ZnO, 0.25% of ZrO$_2$ and 0.04% of Al$_2$O$_3$), ethyl cellulose, butyl carbitol and butyl acetate was coated on the side face of the sintered body. The coated sintered body was heated at 415° to 500° C. for 30 minutes to form a glass layer. When the heating was carried out at a temperature higher than 450° C., crystallization was caused in the glass. The non-linear coefficient α was 81 to 86 when the baking temperature was 415° to 450° C. or 75 to 81 when the baking temperature was 450° to 500° C. In each case, the moisture resistance and the heat cycle resistance were excellent, and when the glass paste was baked at 450° to 500° C., the heat cycle resistance was especially excellent.

EXAMPLE 7

The experiment was carried out in the same manner as in Example 6 except that glass comprising 61.1% of PbO, 8.54% of $B_2O_3$, 3.01% of $SiO_2$, 24.9% of ZnO, 0.93% of $Al_2O_3$ and 1.52% of BaO was used instead of the glass used in Example 6. When the non-linear coefficient α was 75 to 82 when baking was carried out at 425° to 475° C., and both the moisture resistance and the heat cycle resistance were excellent.

EXAMPLE 8

785.5 g of ZnO was mixed with 23.3 g of $Bi_2O_3$, 8.3 g of $Co_2O_3$, 5.8 g of $MnCO_3$, 29.2 g of $Sb_2O_3$, 7.6 g of $Cr_2O_3$, 3.0 g of $SiO_2$ and 0.2 g of $Al(NO_3)_3$ for 10 hours by means of a ball mill. The starting powder was mixed with a 2% aqueous solution of polyvinyl alcohol in an amount of 10% based on the starting powder, and the mixture was granulated and shaped under a molding pressure of 750 Kg/cm² to form a shaped body having a diameter of 12 mm and a thickness of 5 mm. The shaped body was heat-treated by elevating the temperature at a rate of 100° C./hour and maintaining the shaped body at 900° C. for 2 hours. An oxide paste formed by kneading 112 g of $Bi_2O_3$, 175 g of $Sb_2O_3$ and 130 g of $SiO_2$ with 85 g of ethyl cellulose, 600 g of butyl carbitol and 150 g of butyl acetate was coated in a thickness of 100 to 200 μm on the side face of the heat-treated shaped body. Sintering was carried out by elevating the temperature at a rate of 100° C./hour and maintaining the shaped body at 1200° C. for 5 hours. During this sintering process, $Bi_2O_5$ in the paste was evaporated, and $Sb_2O_3$ and $SiO_2$ were reacted with ZnO, whereby a high-resistance intermediate layer 14 composed of $Zn_7Sb_2O_{12}$ and $Zn_2SiO_4$ as the main ingredients was formed on the side face of the resulting sintered body 10 as shown in FIG. 1.

The so obtained sintered body 10 had such an excellent non-linear characteristic that the non-linear coefficient α at 10 μA to 1 mA was about 120. However, sharp convexities and concavities were formed on the surface of the sintered body and the sintered body was readily broken while it was handled. Furthermore, because contamination was not completely removed if the sintered body was once contaminated, the face flashover was readily caused at the impulse test.

Then, a glass paste was prepared by kneading 400 g of a glass powder comprising 2.96% of BaO, 73.7% of PbO, 7.47% of $B_2O_3$, 0.62% of $SiO_2$, 15.2% of ZnO and 0.05% of $ZrO_2$ with 11 g of ethyl cellulose, 78 g of butyl carbitol and 30 g of butyl acetate, and this glass paste was coated in a thickness of 100 to 200 μm on the high-resistance intermediate layer 14 formed on the side face of the sintered body. The coated sintered body was heat-treated in air by elevating the temperature at a rate of 200° C./hour and maintaining the sintered body at 380° C. for 10 minutes to form a glass layer. The main faces of the sintered body were flatly polished, and aluminum electrodes 22 and 24 were formed thereon by spraying to obtain a resistor shown in FIG. 1.

The non-linear coefficient α of the so obtained resistor was high and 123 at a current of 10 μA to 1 mA. The side face of the resistor was smooth and was hardly contaminated, and furthermore, the moisture resistance was excellent. Accordingly, the value of the impulse resistance of this resistor was more than 2 times as large as that of the resistor having no glass coating formed thereon. The glass layer was closely bonded to the sintered body, and even if the heat cycle was repeated 1000 times in the temperature range of from −30° C. to 80° C., the glass layer was not peeled or cracked, and the properties of the resistor were not changed at all.

Figure 3:
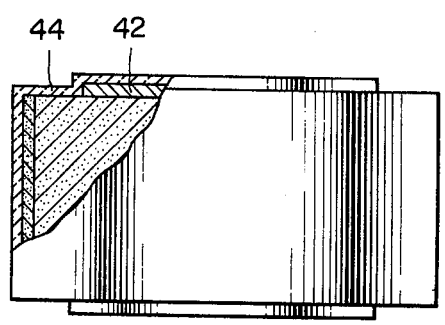

In the same manner as described above, kneading, granulation, shaping, heat treatment, oxide paste coating and sintering were carried out, and both the main surfaces of the sintered body were polished, aluminum was sprayed, the above glass paste was coated on the side face and parts of the main faces and baking was carried out at 380° C. to form a resistor having a structure as shown in FIG. 3. In the obtained resistor, since the end portion of the electrode 42 was coated with the glass layer 44, occurrence of the face flashover was much more prevented and the impulse resistance was about 1.5 times the impulse resistance of the above resistor having a structure shown in FIG. 1.

COMPARATIVE EXAMPLE 2

Resistors having a glass coating formed on the side face through a high-resistance intermediate layer were prepared in the same manner as described in Example 8 except that the following glass composition A or B free of BaO was used for formation of the glass layer. The baking temperatures of the glass compositions A and B were 380° C. and 650° C., respectively.

Glass Composition A:
  76.7% of PbO, 7.43% of $B_2O_3$, 0.62% of $SiO_2$, 15.2% of ZnO and 0.05% of $ZrO_2$ Glass Composition B:
  63% of PbO, 8% of $B_2O_3$, 15% of $SiO_2$, 13% of ZnO and 1% of $ZrO_2$ In each resistor, the leak current at a low voltage was increased by the glass coating, and the non-linear coefficient α was 53 in the resistor comprising the layer of the glass composition A and was 29 in the resistor comprising the layer of the glass composition B.

When a resistor having a structure shown in FIG. 3 was prepared by using the glass composition B, since the baking temperature was high, oxidation was caused in the Al electrode and the adhesion of the electrode to the ZnO body was reduced. Thus, it was confirmed that in order to prevent oxidation of the Al electrode, it is preferred that the baking temperature be lower than about 500° C.

EXAMPLE 9

To 785.3 g of ZnO were added 46.6 g of $Bi_2O_3$, 16.6 g of $Co_2O_3$, 5.8 g of $MnCO_3$, 29.2 g of $Sb_2O_3$, 7.6 g of $Cr_2O_3$, 9.0 g of $SiO_2$ and 0.1 g of $Al(NO_3)_3$, and in the same manner as described in Example 8, a sintered body having a diameter of 56 mm and a thickness of 20 mm through the steps of kneading, granulation, shaping, heat treatment, oxide paste coating and sintering.

A glass paste having a composition shown in Table 4, 5 or 6 was prepared in the same manner as described in Example 8, and then coated and baked at 350° to 550° C. Then, electrode were formed on the main surfaces.

The properties of the so prepared resistors were measured to obtain results shown in Tables 4 to 6.

TABLE 4

| Run No. | Glass Composition (% by weight) | | | | | | Glass Baking Temperature (°C.) | Non-Linear Coefficient α | Heat Cycle Resistance | Moisture Resistance |
| --- | --- | --- | --- | --- | --- | --- | --- | --- | --- | --- |
| | PbO | $B_2O_3$ | $SiO_2$ | BaO | ZnO | $Al_2O_3$ | | | | |
| 1 | 85 | 10 | 1.0 | 0.05 | — | 3.95 | 350 | 51 | ○ | ○ |
| 2 | 85 | 10 | 1.0 | 0.2 | — | 3.8 | 350 | 103 | ○ | ○ |
| 3 | 80 | 10 | 1.0 | 7.5 | — | 1.5 | 350 | 112 | ○ | ○ |
| 4 | 74 | 10 | 1.0 | 15 | — | — | 350 | 113 | ○ | ○ |
| 5 | 64 | 10 | 1.0 | 25 | — | — | 350 | 108 | X | ○ |
| 6 | 75 | 5.0 | 0.05 | 3.0 | 15 | 1.95 | 400 | 112 | Δ | X |
| 7 | 75 | 5.0 | 0.2 | 3.0 | 15 | 1.8 | 420 | 115 | ◎ | ○ |

TABLE 5

| Run No. | Glass Composition (% by weight) | | | | | | Glass Baking Temperature (°C.) | Non-Linear Coefficient α | Heat Cycle Resistance | Moisture Resistance |
| --- | --- | --- | --- | --- | --- | --- | --- | --- | --- | --- |
| | PbO | $B_2O_3$ | $SiO_2$ | BaO | ZnO | $Al_2O_3$ | | | | |
| 8 | 75 | 5.0 | 1.4 | 3.0 | 15 | 0.6 | 500 | 102 | ◎ | ○ |
| 9 | 72 | 5.0 | 3.0 | 3.0 | 15 | 2.0 | 540 | 77 | ◎ | ○ |
| 10 | 90 | 6.0 | 0.5 | 1.5 | — | 2.0 | 350 | 121 | X | X |
| 11 | 70 | 10 | 1.0 | 3.0 | 15 | 1.0 | 400 | 115 | ◎ | ○ |
| 12 | 40 | 25 | 1.4 | 15 | 15 | 3.6 | 400 | 117 | ◎ | ○ |
| 13 | 30 | 25 | 1.4 | 15 | 25 | 3.6 | 400 | 109 | Δ | ○ |
| 14 | 65 | 30 | 1.0 | 3.0 | — | 1.0 | 360 | 102 | ○ | X |

TABLE 6

| Run No. | Glass Composition (% by weight) | | | | | | Glass Baking Temperature (°C.) | Non-Linear Coefficient α | Heat Cycle Resistance | Moisture Resistance |
| --- | --- | --- | --- | --- | --- | --- | --- | --- | --- | --- |
| | PbO | $B_2O_3$ | $SiO_2$ | BaO | ZnO | $Al_2O_3$ | | | | |
| 15 | 85 | 6.0 | 0.5 | 8.5 | — | — | 400 | 113 | ○ | ○ |
| 16 | 85 | 3.0 | 1.0 | 8.5 | — | 2.5 | 430 | 106 | ○ | ○ |
| 17 | 85 | 1.0 | 1.0 | 8.5 | — | 4.5 | 490 | 105 | X | ○ |
| 18 | 50 | 10 | 1.0 | 3.0 | 35 | 1.0 | 420 | 118 | X | ○ |
| 19 | 70 | 10 | 1.0 | 3.0 | 15 | 1.0 | 420 | 122 | ◎ | ○ |
| 20 | 85 | 3.0 | 1.0 | 3.0 | 4.0 | 4.0 | 400 | 113 | ◎ | ○ |
| 21 | 85 | 5.0 | 1.0 | 3.0 | 1.0 | 5.0 | 375 | 106 | ○ | ○ |
| 22 | 80 | 10 | 5.0 | 4.0 | — | 1.0 | 550 | 72 | ○ | ○ |

In these Tables, the heat cycle resistance was evaluated according to the following standard.

X: glass layer was cracked during gradual cooling to room temperature after sintering Δ: impulse resistance was reduced while heat cycle of $-30°$ C.$\sqrt{}80°$ C. was repeated 1000 times ○: characteristic properties were not changed by the above heat cycle test ◎: glass layer was not cracked even if glass layer was taken out from the electric furnace just after sintering The moisture resistance was evaluated according to the following standard.

X: impulse resistance was reduced by standing at a temperature of 40° C. and a relative humidity of 95% for 1000 hours ○: characteristic properties were not changed by standing under the same conditions From the results shown in the above Tables, it will readily be understood that when glass compositions included in the scope of the present invention are used (Runs. Nos. 2, 3, 4, 7, 8, 11, 12, 15, 16, 19, 20 and 21) are used, the non-linear coefficient α is large, and there can be obtained resistors in which the impulse resistance is not reduced at the heat cycle test or moisture resistance test and the face flashover is hardly caused.

EXAMPLE 10

To 891 g of ZnO were added 30 g of $Bi_2O_3$ and 79 g of $MnCO_3$, and in the same manner as described in Example 8, a sintered body having a diameter of 56 mm and a thickness of 20 mm was obtained through the steps of mixing, shaping and sintering at 1150° C. for 4 hours. The sintered body was dipped in a liquid formed by dispersing 600 g of glass powder of Run No. 11 of Table 5 in 800 ml of a solution of 16 g of ethyl cellulose in trichlene, and the dipped sintered body was dried and baked at 400° C. for 10 minutes to form a glass layer. Both the main surfaces were polished and electrodes were attached thereto. The non-linear coefficient α of the so prepared resistor was 80, and even if 100 kA of impulse of $4 \times 10$ μs was applied to the resistor, the face flashover was not caused.

What is claimed is:

1. A voltage non-linear resistor comprising a sintered body composed mainly of zinc oxide, said sintered body including confronting main faces and a side face connecting the main faces to each other, electrodes formed on said main faces of the sintered body, respectively, and a coating glass layer of a glass composition covering the side face of said sintered body, said coating glass layer containing barium oxide and being formed by coating a paste containing an organic binder and the glass composition on said sintered body, after said sintered body has been formed by sintering, and then baking said coated sintered body.

2. A voltage non-linear resistor as claimed in claim 1, wherein the content of barium oxide in said coating glass layer is 0.2 to 15% by weight based on the total amount of the coating glass layer.

3. A voltage non-linear resistor as claimed in claim 1 or 2, wherein said coating glass layer is composed mainly of a lead borosilicate glass.

4. A voltage non-linear resistor as claimed in claim 3, wherein said lead borosilicate glass comprises 40 to 85% by weight of lead oxide, 3 to 25% by weight of boron oxide and 1.5 to 25% by weight of silicon oxide.

5. A voltage non-linear resistor as claimed in claim 3, wherein said lead borosilicate glass comprises 40 to 85% by weight of lead oxide, 3 to 25% by weight of boron oxide and 0.2 to 1.4% by weight of silicon oxide.

6. A voltage non-linear resistor as claimed in claim 3, wherein said lead borosilicate glass comprises 4 to 40% by weight of zinc oxide.

7. A voltage non-linear resistor as set forth in claim 4, wherein said lead borosilicate glass comprises 4 to 30% by weight of zinc oxide.

8. A voltage non-linear resistor as set forth in claim 3, wherein said lead borosilicate glass comprises 0.2 to 15% by weight of zirconium oxide.

9. A voltage non-linear resistor as claimed in claim 4, wherein said lead borosilicate glass comprises 0.2 to 15% by weight of zirconium oxide.

10. A voltage non-linear resistor comprising a sintered body composed mainly of zinc oxide, said sintered body including confronting main faces and a side face connecting the main faces to each other, a high-resistance intermediate layer composed of an inorganic oxide and formed on the side face of said sintered body, and a coating glass layer of a glass composition covering said intermediate layer, said coating glass layer containing barium oxide and being formed by coating said sintered body having said high-resistance intermediate layer thereon, after the sintering of the sintered body, with a paste containing an organic binder and the glass composition, and then baking the coated sintered body.

11. A voltage non-linear resistor as claimed in claim 10, wherein the content of barium oxide in said coating glass layer is 0.2 to 15% by weight based on the total amount of the coating glass layer.

12. A voltage non-linear resistor as claimed in claim 10 or 11, wherein said coating glass layer is composed mainly of a lead borosilicate glass.

13. A voltage non-linear resistor as claimed in claim 12, wherein said lead borosilicate glass comprises 40 to 85% by weight of lead oxide, 3 to 25% by weight of boron oxide and 1.5 to 25% by weight of silicon oxide.

14. A voltage non-linear resistor as claimed in claim 12, wherein said lead borosilicate glass comprises 4 to 30% by weight of zinc oxide.

15. A voltage non-linear resistor as claimed in claim 13, wherein said lead borosilicate glass comprises 4 to 30% by weight of zinc oxide.

16. A voltage non-linear resistor as claimed in claim 12, wherein said lead borosilicate glass comprises 0.2 to 15% by weight of zirconium oxide.

17. A voltage non-linear resistor as claimed in claim 13, wherein said lead borosilicate glass comprises 0.2 to 15% by weight of zirconium oxide.

18. A voltage non-linear resistor as claimed in claim 10 or 11, wherein said intermediate layer comprises zinc silicate and zinc antimonate.

19. A voltage non-linear resistor as claimed in claim 1 or 10, wherein said baking is at a temperature lower than the temperature at which said sintered body is sintered.

20. A voltage non-linear resistor as claimed in claim 19, wherein said baking is at a temperature of 350° C.–650° C.

21. A voltage non-linear resistor as claimed in claim 1 or 10, wherein said coating glass layer also is formed on the main faces of said sintered body on which said electrodes are formed.

22. A voltage non-linear resistor as claimed in claim 1 or 10, wherein said organic binder is selected from the group consisting of ethyl cellulose, polyvinyl alcohol and polyethylene glycol.

* * * * *